April 28, 1942.  O. D. NORTH ET AL  2,281,451

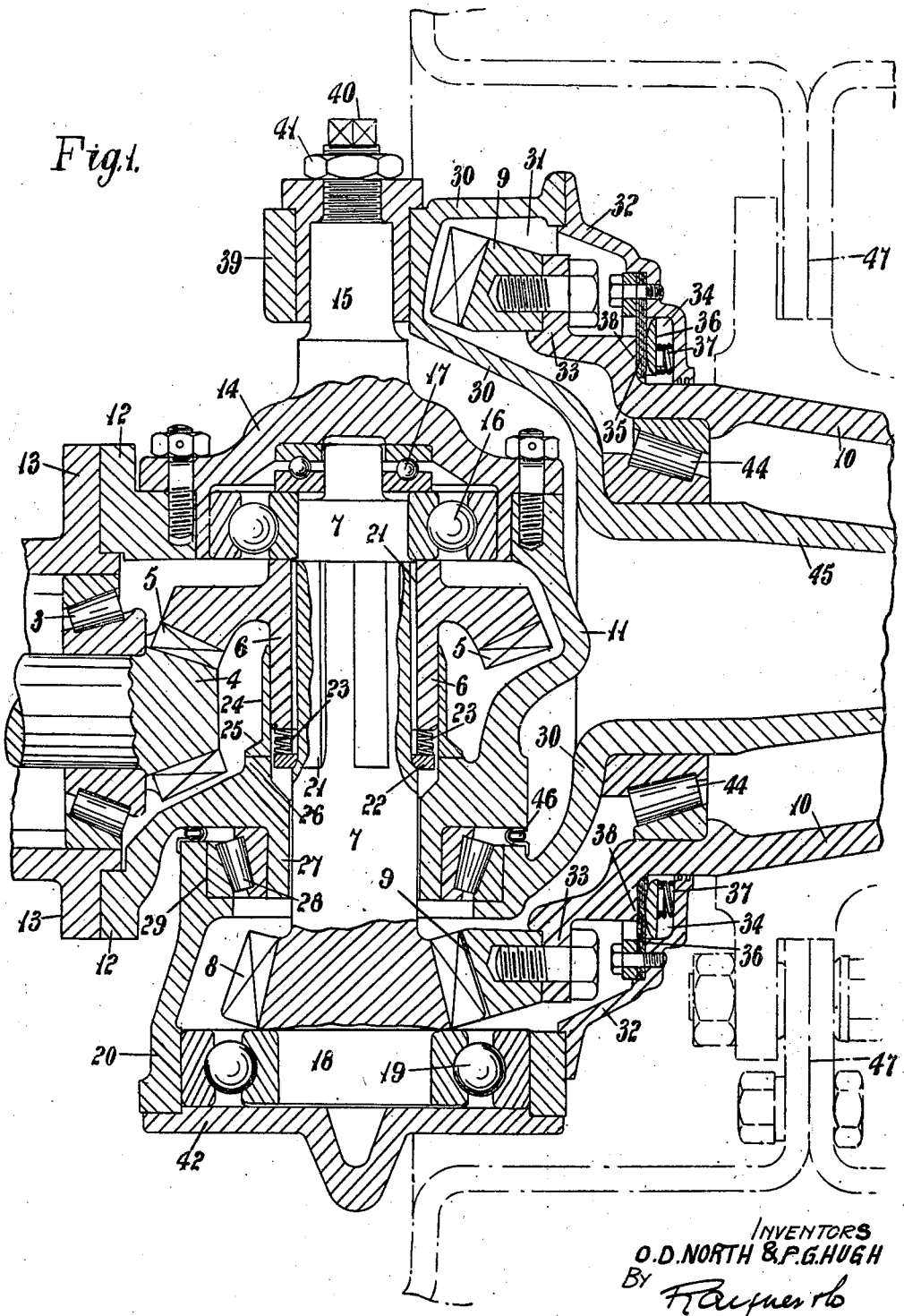

DRIVING GEAR FOR STEERING ROAD WHEELS OF MOTOR VEHICLES

Filed Aug. 26, 1941  2 Sheets-Sheet 2

INVENTOR
O. D. NORTH & P. G. HUGH.
BY Rayner
ATTORNEYS

Patented Apr. 28, 1942

2,281,451

UNITED STATES PATENT OFFICE 2,281,451

DRIVING GEAR FOR STEERING ROAD WHEELS OF MOTOR VEHICLES

Oliver Danson North, Hunton Bridge, and Percy Garibaldi Hugh, Watford West, England, assignors to Scammell Lorries Limited, Watford West, Hertfordshire, England Application August 26, 1941, Serial No. 408,402
In Great Britain April 12, 1940

5 Claims. (Cl. 74—386)

This invention relates to driving gear for the steering road wheels of motor vehicles of the type in which two trains of gears mounted in two housings are arranged to transmit the drive to the appropriate steering road wheel and at the same time to permit the wheel to swivel about a steering axis for the purpose of altering the course of the vehicle. For this purpose some of the gears are mounted about the steering axis so that the engagement of the gears is not affected when the wheel swivels about this axis.

The chief object of the invention is to provide a simple, compact and practical arrangement of the beforesaid type of driving mechanism for the steering wheels of road vehicles which affords ample bearing surfaces to take the heavy load of the vehicle and thrust arising therefrom and from road shocks and ensures accurate alignment of all parts with uniformly efficient meshing of the gears. Another object of this invention is to provide such a type of driving mechanism which permits a relatively large ratio of gear reduction to be effected by the actual train of gears which transmits the drive at the steering head. The invention also enables a very stout and practical arrangement of such gearing, and enables it to be readily assembled and disassembled.

In order that this invention may be clearly understood and readily carried into effect drawings are appended hereto illustrating an embodiment thereof, and wherein:

Fig. 1 is a sectional elevation taken through the steering axis and showing a suitable construction of the invention.

Figure 3:
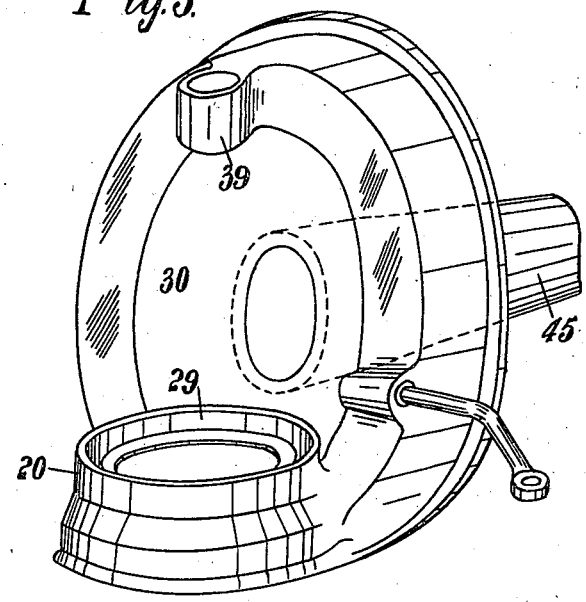
Fig. 3 is a similar view of the housing of the second train of gears and showing the stub-axle for the wheel bearings.

Referring to the drawings the driving axle 1 is located in the axle-housing 2 and is supported at its outer end in the anti-friction bearing 3. The axle 1 is provided with a bevel pinion 4 at its end which meshes with a bevel gear 5 mounted upon a sleeve 6 in driving engagement with a spindle 7 located in axial alignment with the steering axis of the wheel. This spindle 7 also carries a bevel pinion 8 which in turn gears with a relatively large bevel wheel 9 which is in the form of an annular ring bolted to the hub 10 of the steering wheel to be driven. The first train of bevel gears 4 and 5 is located in a housing 11 bolted by the flange 12 to the flange 13 on the axle-housing 2 of the axle 1 and this forms a substantially oil-retaining housing for the first train of gears. On the upper part of this housing is provided a cover 14 bolted or otherwise secured thereto, having an upwardly extending pivot 15 to form a portion of the steering pivot about which the driving wheel may swivel for steering purposes. This cover also forms a housing and secures in position a suitable ball, roller or other anti-friction bearing 16 in which is engaged the upper end of the spindle 7 carrying the pinion 8 of the second train of gears. A suitable ball or other form of thrust bearing 17 is also incorporated at this point. Alternatively a combined radial and thrust bearing may be employed. The lower end 18 of this spindle 7 below the pinion 8 of the second train of gears engages in a relatively large ball or roller anti-friction bearing 19 which is located in a housing 20 forming part of the steering head which swivels about the steering axis and is also arranged to act as an enclosing gear casing for the second train of gears. The sleeve 6 of the bevel gear 5 of the first train of gears engages with its spindle 7 by means of splines 21 or other suitable driving means which permit the spindle to be slidably engaged endwise with the bevel gear 5 whilst affording an effective driving engagement between them. The thrust of the bevel gear 5 is directed upwardly through the sleeve 6 to the thrust bearing 17 located above it. A suitable collar 22 is located on the spindle with spring means 23 between it and the sleeve 6 of the bevel gear 5 so as to normally hold it upwardly in engagement with its bearings, thus ensuring correct engagement between the pinion 4 and the bevel gear 5 of the first train of gears. Located round the lower part of the sleeve 6 of the bevel gear 5 is a further loose sleeve 24, the lower end 25 of which engages against a shoulder 26 in the housing 11 so as to act as an oil or grease retainer. The lower part of this housing is provided with a pivot 27 upon which is mounted a relatively large combined radial and thrust conical roller bearing 28 which is located in a recess 29 in the steering head and thus forms the lower bearing of the steering axis about which the steering head swivels and takes the weight of the housing 11 and axle-housing 2.

Figure 2:
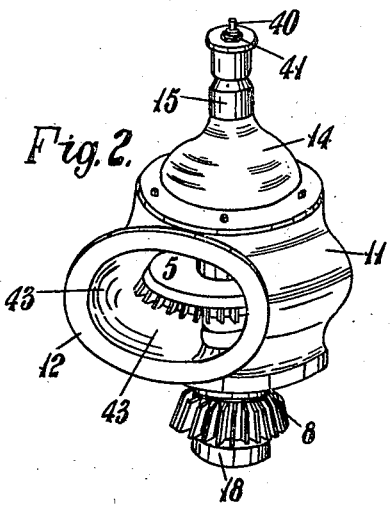
Fig. 2 is a somewhat diagrammatic perspective view of the housing of the initial train of gears and showing the pinion of the second train of gears beneath it.

The steering head may conveniently be a suitable casting 30 having an annular recess 31 adapted to form with a suitable cover 32 a housing for enclosing the annular gear ring 9 bolted or otherwise secured to the flange 33 of the hub 10 of the steering road wheel. The cover 32 of this housing is suitably bolted or otherwise secured in position around the flange 33 of the hub 10 of the wheel and is provided with suitable means for excluding wet and dirt. For this purpose an annular recess 34 is provided in the cover around its inner edge where it encircles a portion of the hub of the wheel. In this recess is located a suitable ring 35 of leather, fabric or other suitable material and a presser plate or ring of metal 36 is urged by suitably arranged springs 37 so as to cause the flexible edge of the leather or other ring 35 to engage loosely against a shoulder 38 on the hub 10 of the wheel. This will act as an effective means for excluding wet and dirt from the interior of the casing and will also retain the oil or grease therein for lubricating the gears. At the upper part of this casing 30 is provided a bearing 39 adapted to engage with the pivot 15 on the cover 14 of the housing 11 of the first train or gears. This forms the upper bearing about which the steering head swivels. A suitable central screw 40 with a locking nut 41 or other device for securing it in position may be arranged to engage the upper end of the pivot for the purpose of adjusting the engagement of the bearings of the steering head. In axial alignment with the upper bearing 39 of the steering head is the lower bearing 28 and a portion of the casing for the gears which encloses the pinion 8 of the second train of gears. This lower bearing 28 engages round the pivot 27 on the lower portion of the housing 11 of the first train of gears and is located thereon by the relatively large rollers or other anti-friction bearing 28 referred to above. This constitutes the lower bearing of the steering head about which it swivels. Beneath this bearing is the enclosing housing 20 for the bevel pinion 8 of the second train of gears and this housing 20 encloses the roller or other anti-friction bearing 19 which supports the lower end 18 of the spindle 7 carrying this pinion. This bearing is held in place by a suitable detachable cover 42 at its lower end. Removal of this cover permits the bearing 19 and the spindle 7 with its pinion 8 to be withdrawn, the spindle sliding axially out of engagement with the splines 21 in the bevel gear 5 of the first train of gears. When this spindle has been withdrawn then the bevel wheel 5 of the first train of gears may also be withdrawn from its housing through a suitably shaped aperture 43 (Fig. 2) arranged in the flange 12 by which it is mounted upon the end of the housing 2 of the driving axle 1. This can of course only be done after the gear housing 11 has been detached from the axle-housing 2.

The housing 20 for the bevel pinion of the second train of gears is open at one side to the annular recess 31 in the casing in which is located the annular bevel ring 9 mounted upon the hub 10 of the driving wheel. This enables the bevel pinion 8 to engage the teeth of the gear ring 9 through this opening. A large roller or other anti-friction bearing 44 is located between the hub 10 of the wheel and the wheel stub-axle 45 which forms a part of the steering head which also constitutes the casing enclosing the second train of gears. This stub-axle and the steering head is shown as a suitable casting with the stub-axle 45 cast in one piece, of hollow construction.

One or both pairs of bevel gears may be of spiral or helical type. Although it is preferred to use two pairs of bevel gears it should be understood that other suitable type of gearing may be substituted for bevel gears. For example it might be possible to substitute a worm and wheel type of gear or skew-gears for one of the pairs of gears.

Suitable packing is provided to ensure the retention of the oil or grease in the respective housings for the two sets of gears. A suitable packing may be provided at one end of the driving axle so as to close the entry to the housing 11 for the first train of gears and to separate it from the interior of the axle-housing 2. A suitable packing ring 46 may also be located between the housing for the first train of gears and the part 20 of the steering head, to act as a retainer for the oil in the housing of the second train of gears, and also to exclude dirt and wet from the housing and the lower swivel bearing 28 of the steering head.

From the foregoing it will be understood that the initial train of gears 4 and 5 in its housing 11 bolted to the end of the axle housing 2, is driven from the axle 1. The pinion 8 on the spindle 7 transmits the drive to the ring gear 9 mounted on the hub 10 on which the road wheel 47 is detachably mounted in any well known manner. The pinion 8 and ring gear 9 constitute the second train of gears and are enclosed in the housing formed by the casting 30 of the steering head and the part 20 thereof. The steering head is adapted to swivel for steering purposes about the pivots 15 and 27 of the housing 11 of the initial train of gears and the shaft 7 which is concentric therewith so that the transmission of the drive from the axle 1 to the hub 10 and road wheel 47 is not interfered with by the movement of the road wheel for steering purposes.

In the arrangement illustrated in the drawings the initial train of gears 4 and 5 effect a gear reduction of about 2½ to 1 and the second train of gears 8 and 9 effect a gear reduction of about 4 to 1. Thus the total gear ratio of drive from the axle 1 to the hub 10 and road wheel 47 is about 10 to 1. Higher or lower gear ratios may be obtained by varying the dimensions of the pinions or gears. In order to take down or disassemble the driving gear, the axle-housing 2 is jacked up and the road wheel 47 removed. The hub 10 with the ring gear 9 may be withdrawn after removing the cover 32. The housing 11 may be separated from the axle-housing 2 after removing the bolts from the flanges 12 and 13. The pinion 8 spindle 7 and bearing 19 may be withdrawn downwardly after detaching the cover 42. This leaves the gear 5 with the sleeve 24 free to be withdrawn laterally through the opening 43 in the housing 11. The collar 22 and spring 23 may also be withdrawn through the opening 43 or may remain in the recess in the housing 11.

An advantage of the present invention is the location and arrangement of the combined radial and thrust bearing 28 and the manner of mounting the vertical spindle 7 directly in bearings in the housing 11 or its cover cap 14 and in the lower housing part 20, the downward thrust on the bearing 28 ensuring maximum efficient driving mesh of the gear wheels 8 and 9 and also accurately centralising the two housings in relation to the axis of articulation so that play and faulty alignment are eliminated.

We claim:

1. Driving gear for the steering road wheels of motor vehicles comprising an axle-housing, a driving axle in said axle-housing, a cup shaped housing fixed to said axle-housing, a gear wheel therein fixed to the driving axle, a cover on said housing, a further housing rotatable about and disposed beneath the base of the beforesaid housing, bearings in said cover and said lower housing, a vertical spindle supported at its ends in said bearings, a pair of gear wheels mounted on the upper and lower ends of said spindle, the upper gear wheel meshing with the gear wheel on the driving axle, a hollow annular steering head integral with said lower housing, an annular gear ring in said steering head meshing with the gear wheel in said lower housing, an upstanding steering pivot on said cover and a co-axial hollow depending pivot on said upper housing, a combined thrust and radial bearing in said lower housing receiving said hollow pivot and supporting said upper housing and axle-housing, a stub-axle fixed to said steering head and a wheel hub carrying said annular gear wheel and rotatable upon said stub-axle.

2. Driving gear for the steering road wheels of motor vehicles comprising an axle-housing, a live shaft therein, a primary gear train, a housing accommodating said gear train and fixed to said axle-housing, a stub-axle, a secondary gear train, a further housing fixed to said stub-axle and accommodating said secondary gear train and pivoted for steering to the primary gear housing, a hub fixed to a gear member of the secondary train and rotatable about said stub-axle, a vertical spindle supported at its ends in bearings in both housings and co-axial with the axis of pivotal connection of the two housings, co-axial gear wheels of said two trains of gear wheels carried by said spindle, one of said co-axial gear wheels being removable with the spindle from the other gear wheel, an opening in the gear train housing fixed to said axle-housing through which the said other gear wheel can be removed, and a combined thrust and radial bearing interposed between the two gear train housings concentric with the said axis of pivotal connected of such housings.

3. In a dirigible road wheel driving gear of a motor vehicle, a substantially hollow annular steering head, a stub-axle carried by the steering head, an axle-housing, a driving axle therein, a gear housing encircled by the steering head and fixed to the axle-housing, pivot members on the gear housing and bearings on the steering head receiving said pivot members for dirigibility, an annular bevel gear ring inside said head, a spindle in said gear housing co-axial with the said pivot members and bearings and supported at its ends in said housing and said steering head, a bevel gear wheel fixed on said spindle and meshing with said gear ring, a bevel gear wheel on said driving axle, a further bevel gear wheel meshing with the gear wheel on the driving axle and positively carried by said spindle and slidable therefrom, and an opening on the axle-housing receiving side of said gear housing to permit the insertion and withdrawal of the said bevel gear wheel slidable from the spindle.

4. Driving gear for the steering road wheels of motor vehicles comprising an axle-housing, a driving axle in said axle-housing, a housing fixed to said axle-housing, a primary train of gear wheels in said housing, a cover cap closing the top of said housing, a secondary gear train and a housing therefor subjacent to the housing, bearings in said cap and said secondary gear train housing, a vertical spindle supported at its ends in said bearings and carrying one gear wheel of each of said gear trains, a pivot upstanding from said cap and a pivot co-axial therewith depending from the primary gear train housing, a combined radial and thrust bearing in the lower housing receiving said depending pivot and supporting the other housing, an annular steering head pivoted to the upper pivot and integral with said lower housing, an annular gear ring forming part of the secondary gear train in said steering head meshing with the lower of the pair of gear wheels on said spindle, and a gear wheel on the driving axle forming part of the said primary gear train and meshing with the upper of the gear wheels on said spindle.

5. In driving gear for the steering road wheels of motor vehicles, an axle-housing, a live axle supported in bearings in the axle-housing, a bevel pinion on the end of the live axle, a primary gear housing bolted to the end of the axle-housing, a cover plate secured to the upper end of the primary gear housing, radial and thrust bearings in the cover plate, a vertical spindle whose upper end is supported by these bearings, splines on this shaft, a bevel gear wheel on the spindle and engaging with these splines and whose gear teeth mesh with the pinion on the live axle, an oil retaining sleeve surrounding the hub of the bevel gear wheel, a collar on the spindle and spring means between the hub of the bevel gear wheel and said collar, a hollow pivot to the lower end of the primary gear housing concentric with the vertical spindle, the lower end of which projects therethrough, a combined radial and thrust bearing located round said hollow pivot, a hollow steering head, an upper bearing thereon engaging a pivot on the primary gear housing cover plate, a lower bearing engaging the combined radial and thrust roller bearing, a housing beneath this bearing into which the vertical spindle projects, a bevel pinion on the lower end of said spindle, an anti-friction bearing in the housing and supporting the vertical spindle below its bevel pinion, a stub-axle on the hollow steering head, a wheel-hub supported by bearings on the stub-axle, a flange on the wheel-hub, a bevel gear ring secured to said flange and gearing with the bevel pinion on the vertical spindle, a cover plate to the hollow steering head enclosing the bevel gear ring and a spring pressed oil retaining and dirt excluding ring with said cover and engaging the hub.

OLIVER DANSON NORTH.
PERCY GARIBALDI HUGH.